Patented Sept. 3, 1929.

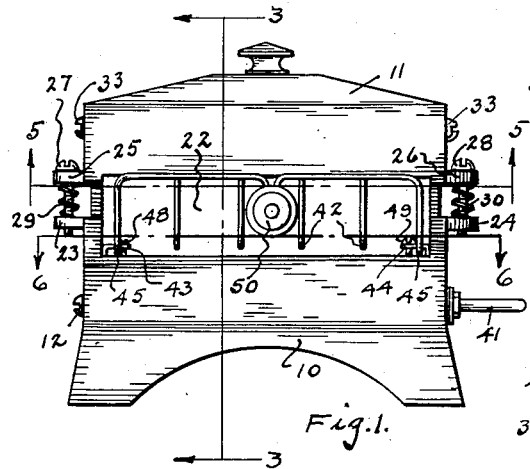

1,726,757

UNITED STATES PATENT OFFICE.

MORTON MURPHY, OF RUSHVILLE, INDIANA.

OVEN TOASTER.

Application filed June 11, 1927. Serial No. 198,018.

This invention relates to toasters for bread and the like and particularly to what may be termed an oven toaster so constructed that the bread may be inserted within an oven-like structure and toasted on two sides simultaneously, as opposed to the heretofore customary open type toaster which in no way permitted the confinement of the vapor or moisture about the bread as it was being toasted.

With my invention a superior quality of toasted bread is obtained, as the bread is not unduly dried out during the toasting process. The invention is descrribed in one specific form, with reference being made to the accompanying drawing, in which—

Fig. 1 is a front elevation of the toaster;

Fig. 2, a top plan view of the toaster;

Fig. 3, a longitudinal section through the toaster on the line 3—3 in Fig. 1;

Fig. 4, a transverse vertical section on the line 4—4 in Fig. 2;

Fig. 5, a horizontal section on the line 5—5 in Fig. 1; and Fig. 6, a horizontal section on the line 6—6 in Fig. 1.

Like characters of reference indicate like parts throughout the several views of the drawing.
The toaster is preferably made in two sections comprising the base 10 and the top 11. The base 10 is rectangular in section and open from below and above. Bolts 12, two in each of two opposed side walls, are passed through the vertical walls of the base 10 to clamp the metal clips 13 against the walls. These clips 13 when so clamped lie entirely along the wall and are not bent as indicated, until the insulating board 14 is laid down to rest on the nuts 15 of the bolts 12, when the clips 13 are then bent over angularly onto the top face of the board 14 to retain it in position against the nuts 15.

To the top face of the board 14 is attached an electrical heating element comprised of a continuous length of coiled resistance wire 16 by means of clips 17, passed over the wire, through the board 14, and bent over on the under side much as a paper fastener is operated. Other means, of course, may be employed to attach the wire 16, but the method indicated is quickly and cheaply accomplished. The particular course of the wire across the board 14 as shown in Fig. 6, is to be noted, as such an arrangement is essential to the best distribution of heat. The ends of the wire 16 are connected to the terminal screws 18.

The top 11 is open from below but closed above and conforms in cross section to the size of the base 10. However, the lower ends of the side walls of the top 11 are offset inwardly to enter slidingly within the walls of the base 10 so that a telescoping arrangement is effected whereby the top 11 may be raised and lowered in relation to the base 10 within the limits of the offset ends 19, 20, and 21 of the walls of the top 11.

An opening 22 is provided within the base 10 and top 11 above the board 14 from the front side, such opening extending partly into the front wall of the base 10 and partly through the front wall of the top 11 so that as the top 11 is raised the opening is increased in height. To maintain the opening 22 at the desired height, ears 23 and 24 are extended from opposite sides of the base 10; corresponding ears 25 and 26 are extended from the top 11; screws 27 and 28 are slidingly passed through the top ears 25 and 26 to screw-threadedly engage in the base ears 23 and 24; and compression springs 29 and 30 surround the screws 27 and 28 normally tending to hold the top ears apart from the base ears. Turning the screws downwardly to overcome the springs will decrease the height of the opening 22 and turning the screws upwardly will permit the springs to raise the top 11 to increase the opening 22.

An insulating board 31 is mounted in the top 11 in the same manner as the board 14 in the base 10, by bending the clips 32 held by the bolts 33 back up against the board 31 to hold it in position against the bolt nuts 34.

The insulating board 31 carries an electrical heating element in the form of a continuous length of coiled resistance wire 35 on its under face by the clips 36. It is to be noted that this top element wire 35 is spaced apart at the center of the board (Fig. 5) as opposed to close spacing of the wire 16 of the lower element. The ends of the wire 35 are secured to the terminal screws 37, from which conducting wires 38 and 39 lead to the plug terminals 40 and 41 mounted on the base 10, the wires 38 and 39 being in electrical circuit also with the terminal screws 18 as indicated in Fig. 6.

A grate 42 is provided to carry the bread and is slidingly entered through the opening 22 to have the side rods 45 slidingly received within the U-shaped guides 43 and 44, secured to each side of the base 10. The front of the grate 42 is turned upwardly to prevent the bread from sliding off in front, and each of the longitudinal central members 46 of the grate are upturned also at the rear ends. A cross member 47 joins the rear ends of the side rods 45, and screws 48 and 49 are passed through the guides 43 and 44 after the grate is entered therein so that the cross member 47 will strike the screws 48 and 49 to limit the outward travel of the grate 42 and so prevent its accidentally being withdrawn from the opening 22 too far.

An insulated knob 50 is mounted on the grate 42 to enable it to be pushed in and pulled out from the opening. By making the top 11 adjustably positioned in height above the base, the spacing of the upper heating element may be varied to conform to the thickness of the bread to be toasted. As the insulating boards 14 and 31 close the space from above and below in which the bread is actually toasted, the only opening into that space is the opening 22, but in use, the bread being toasted, being pushed on the grate 42 to just within the opening practically closes that opening, and the bread is toasted in the presence of the vapor driven from the bread.

I claim:

1. In an oven toaster, a base, an electrical heating element horizontally disposed in the base, a top supported by the base to form an enclosure therewith, an electrical heating element horizontally disposed in the top spaced above said base element, and a grate slidingly carried between said two elements, and means for adjustably spacing apart the said two elements and resilient means for holding a given adjustment.

2. In an oven toaster, a base comprised of vertically disposed walls, an insulating member horizontally disposed within the base closing the opening therethrough, an electrical heating element carried on the upper face of the insulating member, a top carried by the base, a horizontally disposed insulating member positioned in the top, an electrical heating element on the under side of the top insulating member, said top being associated with said base to form an oven enclosure between said two insulating members with an opening into the enclosure, and a grate slidingly entering said opening to lie between said two heating elements.

3. In an oven toaster, a base having vertically disposed walls, an insulating member horizontally disposed between the walls, bolts held by the walls, clips held by the bolts, said insulating member resting on said bolts and said clips being bent over on the top face of the insulating member, an electrical heating element mounted on the top face of the insulating member, horizontally positioned guides above said heating element, and a grate slidingly carried by the guides.

4. In an oven toaster, a base, an electrical heating element horizontally disposed in the base, a top supported by the base, an electrical heating element horizontally disposed in the top spaced above said base element, and a grate slidingly carried between said two elements, said top and said base being associated one with the other to have vertically disposed enclosing walls therebetween permitting the adjusting in elevation of the top heating element in respect to the base heating element and elastic means for holding such adjustment.

5. In an oven toaster, a base having vertically disposed walls, an insulating member horizontally disposed between the walls, bolts held by the walls, clips held by the bolts, said insulating member resting on said bolts and said clips being bent over on the top face of the insulating member, an electrical heating element mounted on the top face of the insulating member, horizontally positioned guides above said heating element, and a grate slidingly carried by the guides, a top, an insulating member horizontally carried by the top, clips bent over onto the under side of the top insulating member to press it upwardly and retain it against stop members in the top, an electrical heating element secured to the under side of the top insulating member, said top being associated with said base wall to form an oven enclosure between said two insulating members and to have an opening therefrom to permit withdrawal therethrough of said grate.

6. In an oven toaster, a base having vertically disposed walls, an insulating member horizontally disposed between the walls, stops held by the walls, clips held by the stops, said insulating member resting on said stops and said clips being bent over on the top face of the insulating member, an electrical heating element carried by the insulating member, horizontally positioned guides above said heating element, and a grate slidingly carried by the guides, a top, an insulating member horizontally carried by the top, clips bent over onto the under side of the top insulating member to press it upwardly and retain it against stop members in the top, an electrical heating element carried by the top insulating member, said top being associated with said base wall to form an oven enclosure between said two insulating members and to have an opening therefrom to permit withdrawal therethrough of said grate.

7. In an oven toaster, a base comprised of vertically disposed walls, an insulating member horizontally disposed within the base closing the opening therethrough, an electrical heating element carried on the insulating member, a top carried by the base, a horizontally disposed insulating member positioned in the top, an electrical heating element on the top insulating member, said top beng associated with said base to form an oven enclosure between said two insulating members with an opening into the enclosure, and a grate slidingly entering said opening to lie between said two heating elements, and means of adjustably spacing said top above said base and of maintaining said oven enclosure throughout the range of the spacing.

8. In an oven toaster, a base, an electrical heating element in the base, a top having side walls telescoping with the base, and an electrical heating element in the top and resilient means retaining the top at various elevations.

9. In an oven toaster, a base, an electrical heating element in the base, a top having side walls telescoping with the base, and an electrical heating element in the top, springs normally spacing the top above the base, and adjustable means for compressing said springs.

10. In an oven toaster, a base, a top forming an enclosure with the base, a pair of spaced apart heating elements within the enclosure, means for varying the spacing of said elements, a grid having side bars and a rear cross bar, grid guides carried by the base, said guides being substantially U-shaped to slidingly receive therein the side bars of said grid, and a stop bolt passed through the legs of one of the guides outside of the side bar therein.

11. In an oven toaster, a base, a top forming an enclosure with the base, a pair of spaced apart heating elements within the enclosure, and resilient means for varying the spacing apart of said elements.

12. In an oven toaster, a base, a top forming an enclosure with the base, a pair of spaced apart heating elements within the enclosure, and resilient means for varying the spacing apart of said elements, said elements being maintained parallel one to the other through the range of the intervening space.

In testimony whereof I affix my signature.

MORTON MURPHY.